Sept. 20, 1949.  E. J. CULLIGAN  2,482,727
APPARATUS FOR PROVIDING SOFT WATER WHERE
NO WATER PRESSURE SYSTEM EXISTS
Filed Oct. 7, 1946  2 Sheets-Sheet 1
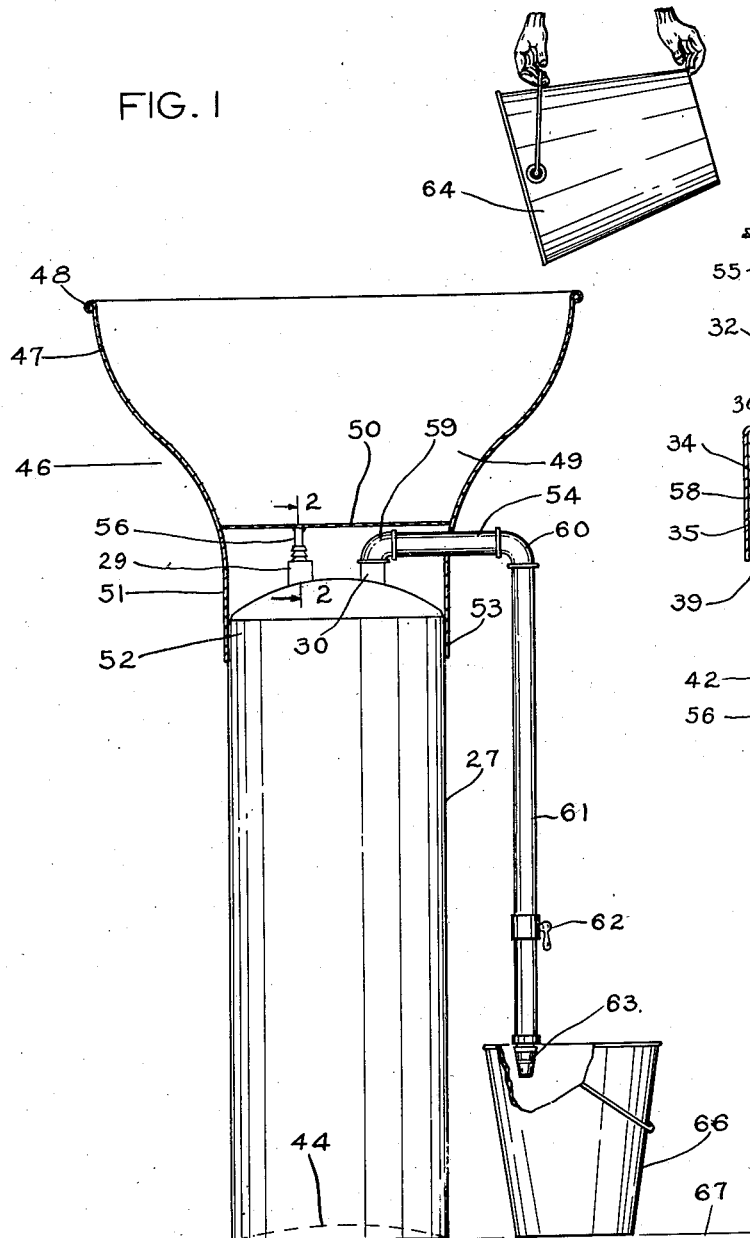
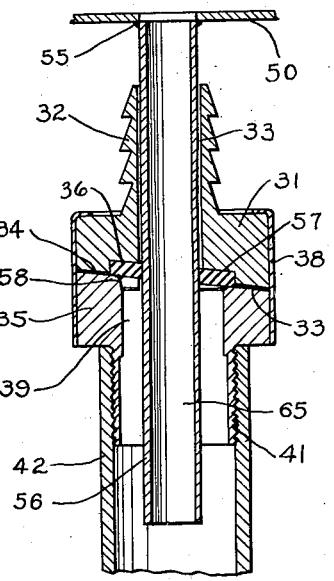
Inventor
EMMETT J. CULLIGAN
By F. A. Whiteley
Attorney Sept. 20, 1949. E. J. CULLIGAN 2,482,727
APPARATUS FOR PROVIDING SOFT WATER WHERE
NO WATER PRESSURE SYSTEM EXISTS
Filed Oct. 7, 1946 2 Sheets-Sheet 2

Inventor
EMMETT J. CULLIGAN
By R. A. Whiteley
Attorney

Patented Sept. 20, 1949

2,482,727

UNITED STATES PATENT OFFICE 2,482,727

APPARATUS FOR PROVIDING SOFT WATER WHERE NO WATER PRESSURE SYSTEM EXISTS

Emmett J. Culligan, San Bernardino, Calif., assignor to Culligan Zeolite Company, Northbrook, Ill., a firm Application October 7, 1946, Serial No. 701,648

2 Claims. (Cl. 210—24)

My invention relates to a method and apparatus for providing soft water where there is no pressure water system, as on farms and the like, which consists primarily of a zeolite container of such size that it can be readily transported in an ordinary automobile and yet which is provided with the same connector means used in connection with water pressure systems, together with means whereby water may be introduced into the softener casing and be caused to flow through the zeolite therein by gravity, and with means for receiving the soft water after it has gone through the zeolite and has been discharged from the water softener casing.

Water softening in homes as heretofore practiced has required a water pressure system. The tanks or zeolite containers are of considerable length and size, and have two conduits removably connected therewith; one for introducing the pressure water, ordinarily at the bottom of the zeolite container, and the other for taking from the zeolite container the water which has been caused to traverse the container and be softened thereby.

The tanks are customarily connected in the pressure water system in such a manner that valves can shut off the water temporarily when the zeolite in any container has become exhausted. The container may then readily be removed from connection with the water pressure system to be taken to a central servicing station where the zeolite may be reactivated, and a second zeolite tank containing reactivated or active zeolite may be put in place of the one removed.

This method of furnishing soft water in homes works very well indeed where there is a water pressure system. It is not available for homes, such as farm homes, where there is no water pressure system. This is true for two reasons; first, because the water pressure system is lacking, and no means has been developed for replacing it with another method of getting the water through the zeolite, and second, because the zeolite tanks have been too large and heavy for transporting in an ordinary automobile to the central servicing station.

I have discovered a simple way to obviate this difficulty. This method employs the same means of inlet and exhaust for the water which are used in water softeners in connection with water pressure systems, but obviates the above noted difficulties.

To get the water to flow through the zeolite in the container, the identical means of introducing and withdrawing of the water which is used with a water pressure system are employed in my method, with other means for the introducing of water into the pipe which takes it to the bottom of the zeolite in the water softening container.

To accomplish this I arrange a simple removable water container to be attached to the top of the zeolite container and conform to its upper dimensions, in connection with an inlet pipe which seals itself in the standard water inlet. And for withdrawing the water from the water softening tank I employ a piping connected at its upper end with the withdrawal pipe of the zeolite tank in exactly the same way as when the tank is used in a water pressure system, with a depending pipe which is adapted to discharge by gravity into a receptacle such as a pail, trough or the like after the water has passed through the zeolite.

For the weight problem arising from need to convey the zeolite tanks for reactivating in an ordinary automobile, it is, of course, only necessary to reduce the length of the zeolite container and to use lighter metals making it up (since it is not subjected to high water pressures as is true of the zeolite containers used in water pressure systems), in order to get a construction which is light enough to be handled and transported for regenerating in an ordinary automobile.

It is a principal object of my invention, therefore, to provide a relatively light zeolite containing water softening tank with means for introducing water into the bottom of the zeolite in the container and taking it from the top thereof, which has connector means at the top identical with those employed in standard water softener systems, and to apply to said connector means other means for causing the water to go to the bottom of the zeolite water softening container and out of the top actuated in its movements solely by gravity.

It is a further object of my invention to associate with the standard means for introducing water into a zeolite water softening container a receptacle formed with a chamber open at the top and having pipe means extending from the bottom thereof, which pipe means may be inserted into the standard water connector means of a standard water softener employed with water pressure systems, and which by its manner of construction will seal itself thereinto, whereby water may be employed in said chamber and will flow by gravity through the pipe extension normally employed to the bottom of the zeolite container.

It is a further object of my invention to connect to the standard water outlet means for a water softening tank employed in connection with water pressure systems, a set of piping which will convey the soft water therefrom and discharge it into a pail, a spout or other suitable conveying means, acting solely by gravity.

It is a further object of my invention to form in the standard connector member from a system to convey water from a pressure water system to the bottom of a zeolite water softening tank, a gasket member such that when a pipe on the water receptacle to be supported at the top of the zeolite container is thrust through the water delivery opening the inner walls of the gasket will grip the outer walls of said pipe and seal it against leakage.

The full objects and advantages of my invention will appear in connection with the detailed description thereof which will now be given in the following specification, and the novel features of my invention which produce the above noted useful, important and advantageous results will be particularly pointed out in the claims.

In the drawings illustrating an application of my invention in one of its forms:

Fig. 1 is a view of my improved water softener in position, where the water receiving chamber is getting water from a pail held in the hand, and such water discharges into a pail resting upon the same surface which supports the water softener.

Fig. 2 is a sectional view on an enlarged scale taken substantially on line 2—2 of Fig. 1.

Figure 6:
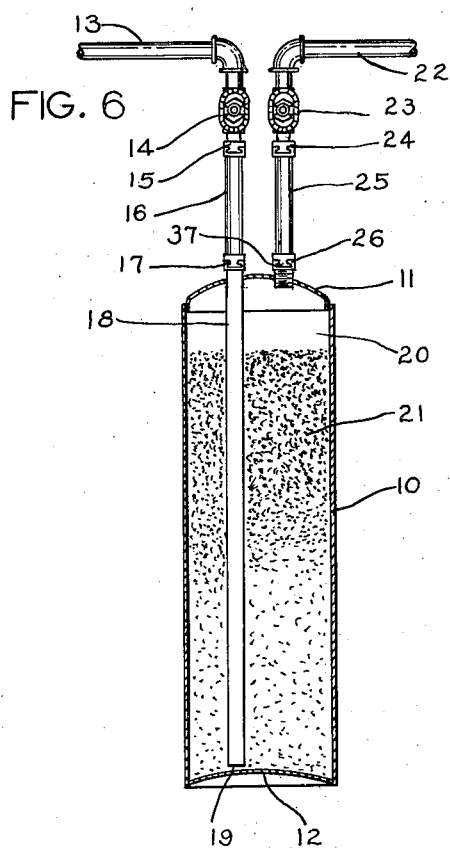
Fig. 6 is a sectional elevation view of the zeolite water softener tank as installed in a standard water pressure system.

Referring first to Fig. 6, a standard water pressure system tank 10, as shown in vertical cross section, has an upwardly curved top 11 and also an upwardly curved bottom 12, as clearly shown in Fig. 6. An inlet pipe 13 of the standard pressure water system goes through a valve 14 for shutting off and turning on the water to a connector 15, to which is connected a flexible extension 16.

The flexible extension 16 is in turn connected with a connector 17, whereby it is put in communication with the interior of a pipe 18 extending through the top wall 11 and to a point 19 near the bottom of the chamber 20 inside the zeolite water softener container 10. The zeolite is indicated at 21.

The opening at the bottom of pipe 18 indicated at 19 thus carries the water to a point close to the inside of the upwardly curved bottom tank part 12.

An outlet pipe 22 to the pressure water system is connected to a valve 23 which in turn by connector 24, substantially the same as connector 15, unites in the system the flexible pipe member 25. Pipe member 25 is connected at 26 to the discharge opening from chamber 20 inside tank 10, whereby water is forced under the water pressure of the system through pipe 18 to the bottom of the zeolite in tank 10, and is withdrawn therefrom to be delivered to any point of use, as at any faucet in the water system of the residence where the apparatus is installed.

The above describes the standard water softening method employed in connection with a pressure water system. The remaining figures show the manner in which I have embodied my invention in connection with substantially the same zeolite tank readily to be removed from the system.

This is necessary in order that the zeolite in any tank from time to time may be reactivated, and the above is the best method of maintaining active zeolite in water softening systems in homes.

Figure 3:
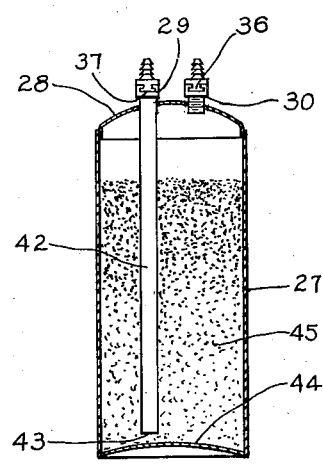
Fig. 3 is a side elevation sectional view of a zeolite container installed in connection with my invention.
Figure 4:
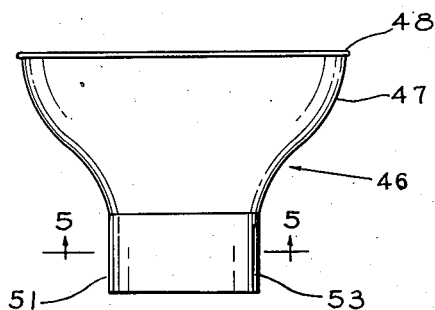
Fig. 4 is a side elevation view of the receptacle adapted to be positioned on the top of the zeolite container to receive water poured thereinto.
Figure 5:
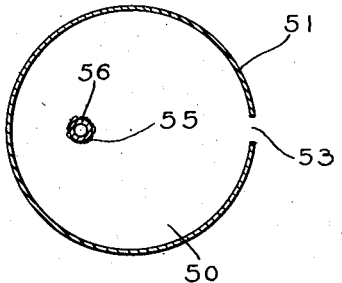
Fig. 5 is a sectional view on line 5—5 of Fig. 4.

As shown in Fig. 3 a zeolite tank 27 may be considerably shorter than the tank 10 for pressure water systems, and may be made of considerably lighter metal.

In general, it will have the same diameter, a curved top 28 similar to top 11, and in that top a pair of connector members 29 and 30, similar to connector members 17 and 26. These connector members are shown somewhat in detail in Fig. 2.

Each of the connectors comprises an upper member 31 having thereon a ribbed nipple 32, for receiving a flexible tubing, and having a central opening 33 extending through the portion 31 and the nipple 32. The bottom wall 33' of the member 31 is angularly disposed and is adapted to engage a similar angularly disposed top wall 34 of a lower member 35, all as shown in Fig. 2.

The lower member 35 is provided with a transverse slot 36, Fig. 3, and the upper member 31 has a similar transverse tongue member 37, Fig. 6, adapted to be engaged in the slot 36. With this arrangement the two members may be forced together so as to make of the two members one unitary cylinder, which, in my present form, may have about it a cylindrical protective shell 38.

The lower member 35 of the connector member has an opening 39 considerably larger in diameter than the opening 33 in the upper member, and to the bottom of the member 35 is an extended threaded nipple 41.

The nipple 41 will have screwed on it a pipe 42 which is similar to the pipe 18 shown in Fig. 6 and extends to a point 43 close to the upwardly curved bottom 44 of the zeolite container 27. It follows that any water which is delivered through the ribbed nipple 32 must certainly be delivered to the pipe 42 and discharge at 43 at the bottom of the zeolite mass 45 in zeolite container 27.

A receptacle, indicated generally by the numeral 46, has a flaring top portion 47 finished about its circumference with a bead and wire 48, which provides a receptacle chamber 49, Fig. 1.

There is a bottom wall 50 to this receptacle and a cylindrical extension 51, which is adapted to fit snugly over the upper cylindrical part 52 of the zeolite container 27.

The extension 51 is provided with a slot 53 at the side thereof. This slot serves two purposes, first as an opening to pass over a horizontal piping 54 of a discharge pipe system hereinafter described, and second to allow the the lower portion of the cylindrical extension 51 to expand and hold it by spring pressure upon the upper end 52 of the zeolite container 27.

Secured to the bottom wall 50 of cylindrical extension 51, by soldering, welding or in any desired way, as indicated at 55, is a short tubular member 56. The member 56 is adapted to be inserted through the opening 33 along the inside of the ribbed nipple 32.

Through a central opening in a gasket member 57, which is seated in a socket 58 in the upper member 31 of the connector member, and a sufficient distance through the opening 39 and the open-ended nipple 41, to enter the downwardly extended pipe 42, as best shown in Fig. 2, but shown also in Fig. 1, extends a pipe 42.

The tube 56 makes a sealing connection with the pipe 42 by being merely inserted as indicated in Fig. 2. To the connector 30 is secured a removable elbow 59 which connects with the pipe 54 and in turn by elbow 60 connects with a downwardly extended pipe 61. The pipe 61 has therein a shut-off valve 62 and a discharge nozzle 63.

As clearly indicated in Fig. 1, water is discharged by hand into the receptacle chamber 49 from a pail 64 (or other means of transferring the water) until the chamber 49 is filled. This water travels through the interior passageway 65 within pipe 56 and into the pipe 42 from which it discharges at 43 at the bottom of the mass of zeolite 45 in zeolite container 27. It moves by gravity from that position through the discharge pipe 59, 54, 61, and from time to time is discharged into the receiving pail 66 resting upon the surface support 67 which supports the tank 27.

The receptacle chamber 49 may be filled with water. This will be several pailfulls to be received by the pail 66. The soft water thus provided may be taken to any point of use, as a dishwashing sink, a clothes washer and the like.

The advantages of my invention will be apparent from the foregoing description. A primary advantage is, of course, that it provides a simple and yet effective means of supplying soft water in buildings, such as farm buildings, lake cottage buildings and the like, where water has to be pumped from the ground and no system is established by putting the water so pumped under pressure.

A great advantage of my invention resides in the fact that the main water softener chamber will always be filled with soft water which has in all probability remained in contact with the zeolite for some considerable time. Whenever soft water is desired, therefore, it is only necessary to fill the top receptacle with a sufficient amount of unsoftened water and then to turn the faucet which allows the water to be forced by gravity from the top of the softener chamber to descend through a pipe into a bucket or other receptacle.

This takes place slowly, so if there is need for only small amounts of water at any given time, or even where very considerable quantities of softened water are required, the softening will take place effectively, since the water to be softened enters the softening tank at the bottom thereof and owing to the large cross-sectional area of the softening tank, the water will rise slowly through the water softening material and discharge in a thoroughly softened condition from the top. This is the preferred and more efficient way of moving the water. Nevertheless, it is possible to effect water softening where the water moves through the zeolite downwardly or from the top toward the bottom.

I claim:
1. In combination with an enclosed tank containing a water softening material of the base exchange type, a first conduit extending through the top of said tank having a right-angled part extending to outside the limits of the tank, a removable receiver for detachable mounting on the top of said tank consisting of a funnel-shaped member, the lower portion of said member having an open-ended slot formed therein to permit vertical passage of the member over said part, a second conduit extending through the top of the tank and into the water-softening material in the tank a partition extending transversely across the interior of said member, a third conduit extending downwardly from said partition and positioned to aline with said second conduit and formed of a diameter which is less than that of the second of said conduits to permit vertical entry of said third conduit into said second conduit, and a resilient annular gasket positioned in said second conduit and cooperable with the outer surface of said third conduit to form a liquid-tight seal between said conduits when said receiver is mounted on the tank.

2. A gravity feed water softener embodying, in combination, an enclosed tank containing a water softening agent of the base exchange type, a first conduit connected to the top of said tank and extending downwardly alongside the outer surface of the tank, valve means in said conduit, a second conduit originating above the tank and extending vertically through the top wall of the tank to an interior point adjacent the bottom of the tank, a resilient annular gasket positioned within the interior of said second conduit, and a detachable means for introducing water under gravity pressure into said tank including, an open-topped funnel-shaped water receiver which is adapted for removable mounting on the top of said tank to thereby provide a head pressure of water above the top of the tank, a partition extending transversely across the interior of said receiver, a third conduit depending from said partition for vertical entry into said second conduit and through said gasket to provide a liquid-tight seal between said conduits, the lower part of said receiver forming a skirt for supporting said receiver on the lateral surface of said tank and having a vertical slot for passage over a portion of said first conduit, said skirt forming a resilient connection between said receiver and said tank.

EMMETT J. CULLIGAN.

REFERENCES CITED

The following references are of record in the file of this patent:

UNITED STATES PATENTS

| Number | Name | Date |
| --- | --- | --- |
| 1,557,117 | Sweeney | Oct. 13, 1925 |
| 1,741,645 | Mutch | Dec. 31, 1929 |
| 1,751,671 | Webb | Mar. 25, 1930 |
| 1,976,906 | Waldron | Oct. 16, 1934 |
| 2,252,065 | Culligan | Aug. 12, 1941 |

FOREIGN PATENTS

| Number | Country | Date |
| --- | --- | --- |
| 374,117 | Great Britain | 1932 |